United States Patent [19]

Hashimoto et al.

[11] Patent Number: 4,747,344

[45] Date of Patent: May 31, 1988

[54] METHOD OF CONVEYING MATERIALS AND TUBULAR BELT CONVEYOR THEREFOR

[75] Inventors: Kunio Hashimoto, Kitakyushu; Haruo Okazaki, 1-2-20, Miyanomachi, Yahatahigashi-ku, Kitakyushu-shi, Fukuoka-ken, both of Japan

[73] Assignee: Haruo Okazaki, Fukuoka, Japan

[21] Appl. No.: 28,197

[22] Filed: Mar. 20, 1987

[51] Int. Cl.<sup>4</sup> ............................................. B65G 15/08
[52] U.S. Cl. ..................................... 100/173; 198/819
[58] Field of Search ............................... 198/819–830, 198/607; 100/144, 151, 153, 173, 176

[56] References Cited

U.S. PATENT DOCUMENTS 4,625,860 12/1986 Kawasaki et al. .................. 198/819
4,630,726 12/1986 Hashimoto .......................... 198/819

FOREIGN PATENT DOCUMENTS 3606129 8/1986 Fed. Rep. of Germany ...... 198/819
0036209 2/1985 Japan .................................. 198/819

Primary Examiner—Robert J. Spar
Assistant Examiner—Lyle K. Kimms
Attorney, Agent, or Firm—Poms, Smith, Lande & Rose

[57] ABSTRACT

A tubular belt conveyor is supported by a plurality of support frames, some of which comprise a fixed roller and a pressing roller which is biased by compression springs to get close and away with respect to the fixed roller. Between the two rollers, narrow space is formed through which the forward belt is elliptically deformed so that the conveyed materials may be compressed. Particularly, with a steep slope, the materials thus solidified by the rollers can be easily carried by the tubular belt conveyor without slipping down.

4 Claims, 2 Drawing Sheets

METHOD OF CONVEYING MATERIALS AND TUBULAR BELT CONVEYOR THEREFOR

BACKGROUND OF INVENTION

The present invention relates to a method of conveying materials and a tubular belt conveyor therefor. Particularly, the present invention relates to a method of conveying powdery or granular materials with a steep slope and a tubular belt conveyor for carrying out the method.

There is a conventional tubular belt conveyor in which the larger part of an endless conveyor belt is rolled up to a tubular shape in which powdery or granular materials are enclosed for continuously conveying. The tubular belt conveyor can easily transfer powdery or granular materials with a slope compared with other types of belt conveyors.

But, when the materials to be conveyed are heavy or flowable such as dry sand or when the angle of inclination is very large, the conveyed materials are likely to slip down and accumulate in the lower part, so that the conveying becomes unsmooth or is obstructed.

To solve the problems, Japanese Utility Model Laid-Open Publication No. 57-147807 describes that a plurality of fins are provided inside the conveyor belt to prevent materials from slipping down, and Japanese Utility Model Laid-Open Publication No. 58-83313 describes that a plurality of bellows are provided inside the conveyor belt to prevent materials from slipping down.

Such devices could prevent conveyed materials from slipping down, but the structure of the conveyor belt is very complicate, which is too expensive in the production, and for long use, the projected fins or bellows are likely to be damaged or broken.

OBJECTS OF INVENTION

The primary object of the present invention is to provide a method of conveying materials and a tubular belt conveyor for carrying out the method to prevent conveyed materials from slipping.

Another object of the present invention is to provide a tubular belt conveyor which is simple in construction and is less expensive in production.

According to the present invention, there is a method of conveying materials continuously by a tubular belt conveyor in which the larger part of a circulating endless conveyor belt is rolled up to a tubular shape, the method comprising passing a forward tubular belt through narrow space to deform it into an elliptical shape in which the compressed materials are conveyed.

According to the present invention, there is also provided a tubular belt conveyor in which the larger part of a circulating endless conveyor belt is rolled up to a tubular shape in which materials to be conveyed are enclosed for continuously conveying, the conveyor comprising a plurality of support frames for supporting the belt, one or more fixed rollers disposed within some of the support frames, one or more pressing rollers disposed to get close and away with respect to the fixed rollers within the support frames, and compression means for biasing the pressing rollers towards the fixed rollers, whereby narrow space is formed between the fixed and the pressing rollers through which the forward belt passes to be elliptically deformed so that the materials may be compressed.

BRIEF DESCRIPTION OF DRAWINGS

Other and further objects, features and advantages of the invention will appear from the following description taken in connection with the accompanying drawings wherein.

DESCRIPTION OF INVENTION

Figure 1:
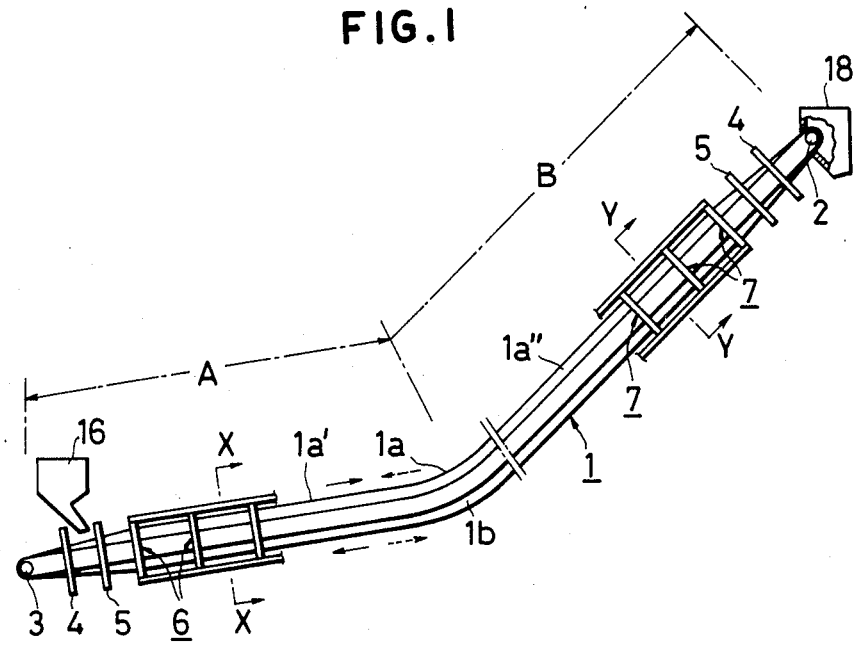
FIG. 1 is a schematic front view of a first embodiment of a tubular belt conveyor according to the present invention.

FIG. 1 shows a schematic front view of a tubular belt conveyor according to the present invention, which comprises a rear gentle slope A and a front steep slope B. Front and rear flattened portions of an endless conveyor belt 1 are wound around a front end roller 2 and a rear end roller 3 respectively, and the belt 1 is circulated by drive means (not shown), as shown by solid-line arrows in FIG. 1.

In the vicinity of the rollers 2 and 3, first and second rolling-up frames 4 and 5 are disposed, and between the second rolling-up frames 5, a plurality of first and second support frames 6 and 7 are arranged around the gentle and the steep slopes A and B of the belt respectively.

Figure 3:
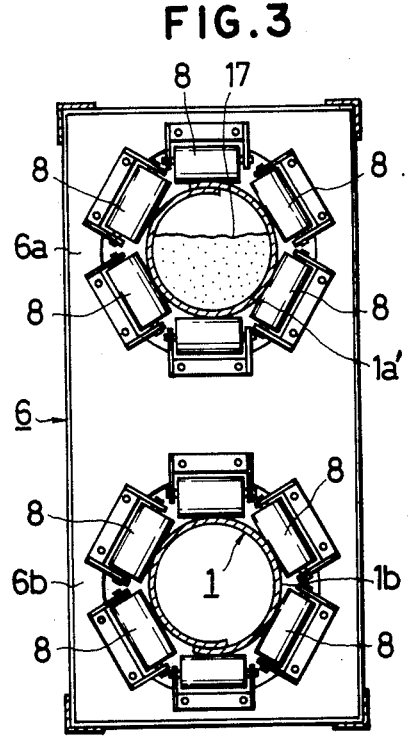
FIG. 3 is an enlarged sectional view taken along line X—X in FIG. 1.

As shown in FIG. 3, each first support frame 6 comprises two compartments 6a and 6b vertically disposed, and a plurality of support rollers 8 are radially arranged in each compartment 6a and 6b.

Figure 4:
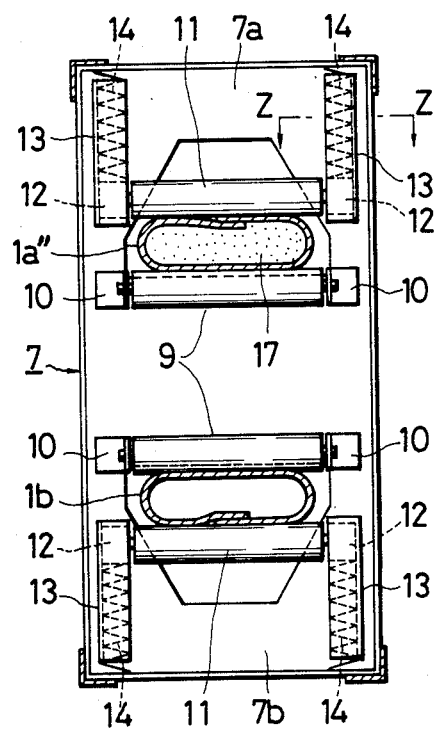
FIG. 4 is an enlarged sectional view taken along line Y—Y in FIG. 1.
Figure 5:
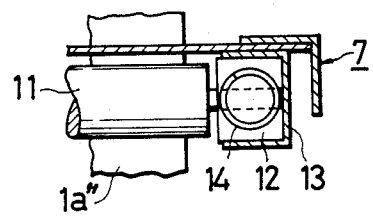
FIG. 5 is an enlarged sectional view taken along line Z—Z in FIG. 4.

FIGS. 4 and 5 show a first embodiment according to the present invention, and as shown in FIG. 4, the second support frame 7 comprises two compartments 7a and 7b vertically disposed, and at the lower part of the upper compartment 7a, a horizontal fixed roller 9 is rotatably secured between bearings 10.

Above the fixed roller 9, a pressing roller 11 parallel therewith is supported between rectangular bearings 12 and is movable vertically through channel-like rails 13 which are oppositely open and vertically secured to a right and a left walls of the upper compartment 13. The bearings 12 are biased towards the fixed roller 9 by adequate compression means such as compression springs 14.

Between the fixed roller 9 and the pressing roller 11, narrow space is formed.

A lower compartment 7b is composed in vertically symmetrical relation with the upper compartment 7a.

Figure 2:
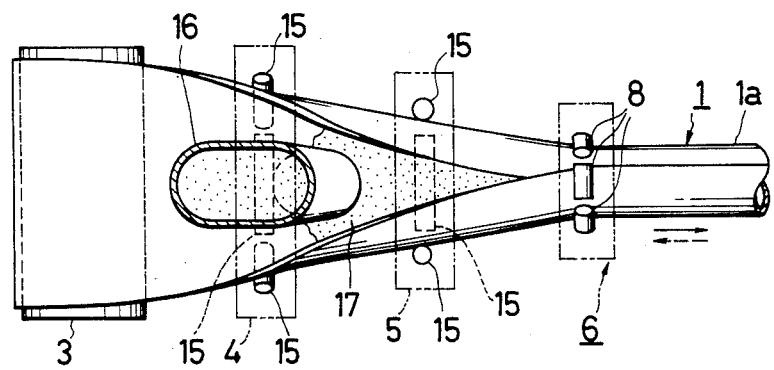
FIG. 2 is an enlarged plan view of a portion in the vicinity of a hopper in the first embodiment.

Similar to the first support frame 6, a first and a second rolling-up frames 4 and 5 comprises two compartments vertically disposed (not shown), and as shown in FIG. 2, the upper compartment of the first rolling-up frame 4 comprises a horizontal rolling-up roller 15 and a pair of rolling-up rollers 15 which are arranged in up and outer directions from both ends of the horizontal roller. The upper compartment of the second rolling-up frame 5 comprises a horizontal rolling-up roller 15 and a pair of rolling-up rollers 15 extending vertically adjacent to both ends. The lower compartment of the rolling-up frames 4 and 5 is composed in vertically symmetrical relation with the upper compartment.

As shown in FIG. 2, a flattened forward belt 1a which is rotated around the front end roller 3 is rolled up through the rolling-up rollers 15 in the first rolling-up frame 4.

Then, from a hopper 16 above the front end roller 3, the materials to be conveyed are thrown onto the forward belt 1a, which is formed to a tubular shape by the rolling-up and the support rollers 15 and 8 to enclose the materials 17, as it passes through the second rolling-up frame 5 and the upper compartment 6a of the first support frame 6. The tubular belt 1a' thus formed runs with the gentle slope A.

As shown in FIG. 4, when the tubular belt 1a' passes through the narrow space in the upper compartment 7a of the second support frame 7, it is compressed by the pressing roller 11 to form a horizontal elliptical belt 1a" which rises with the steep slope B.

The longitudinal sectional area of the elliptical belt 1a" is smaller than that of the tubular belt 1a'. The conveyed materials are, therefore, somewhat solidified and the upper space vanishes through which the materials 17 are flown down. Thus, even if the materials 17 are flowable such as dry sand, they can be conveyed upwardly with the steep slope B without slipping down.

The elliptical belt 1a" which goes away from the second support frame 7 is spread through the second and the first rolling-up frames 5 and 4, and the materials 17 are thrown onto the hopper 18 surrounding the front end roller 2.

The return belt 1b which is rotated around the front end roller 2, similar to the above, is rolled up through the lower compartment in the first and the second rolling-up frames 4 and 5, and, then, passes through the lower compartments in the second and the first support frames 7 and 6 and the second and the first rolling-up frames 5 and 4 to return to the rear end roller 3 for circulation.

This embodiment relates to a tubular belt conveyor which is rolled up by overlapping the inner surface of one peripheral end on the outer surface of the other peripheral end.

Figure 6:
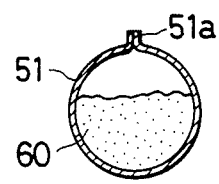
FIG. 6 is a longitudinal sectional view of a tubular belt in a second embodiment.
Figure 7:
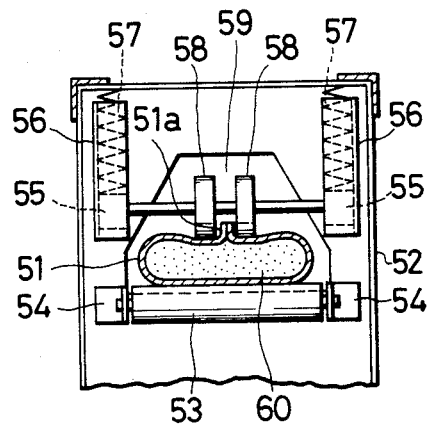
FIG. 7 is a sectional view in the second embodiment and similar to FIG. 4.

FIGS. 6 and 7 show a second embodiment according to the present invention in which a tubular belt is rolled up by contacting the inner surfaces of the belt 51 with each other at the peripheral ends. The numerals 52, 53, 54, 55, 56 and 57 indicate a second support frame, a fixed roller, bearings, bearings, rails and compression springs, respectively.

A pair of pressing rollers 58, which corresponds to the pressing roller 11, have a larger diameter and smaller width than the roller 11, and between the rollers 58, annular space 58 is formed. The numeral 60 indicates conveyed materials.

In this embodiment, an upwardly projected portion 51a of the tubular belt 51 is inserted into the annular space 59 with a slight gap, and, therefore, as shown in FIG. 7, it can be elliptically deformed, which could attain the effects similar to the above.

In the first embodiment, the return belt 1b with the steep slope B is elliptically deformed as well. But in both of the first and the second embodiments, the return belt contains no conveyed material, and the belt may be a tubular form as shown in FIGS. 3 and 6, or an opened elliptical form.

As shown in broken-line arrows in FIG. 1, as the forward belt 1 runs downwardly with the steep slope B, it is elliptically deformed between the fixed and the pressing rollers 10 and 11 as well, so that the conveyed materials are prevented from forwardly slipping down.

In this case, the hopper 16 for supplying the materials to be conveyed may be exchanged for the hopper 18.

Further, the narrow space between the fixed and the pressing rollers may be provided around a horizontally running belt. The conveyed materials solidified by the pressing rollers can be carried smoothly without horizontally slipping.

Further, the embodiments shown in the drawings describe one fixed roller and one pressing roller horizontally disposed. The rollers are not horizontally disposed, but may be obliquely or vertically disposed. Further, two or more pressing rollers may be arranged in substantially arcuate form against one fixed roller, or two or more fixed rollers may be arranged in substantially arcuate form against one pressing roller.

It is to be understood that the description herein merely relates to preferred embodiments of the present invention, and the various changes and modifications may be made without departing from the scope of the following claims:

What is claimed is:

1. A tubular belt conveyor in which a circulating endless conveyor belt is rolled up to a tubular shape in which materials to be conveyed are enclosed for continuously conveying, the conveyor comprising:
    a plurality of support frames for supporting the belt;
    one or more fixed rollers disposed within some of the support frames;
    one or more pressing rollers disposed to get close and away with respect to the fixed rollers within the support frames; and
    compression means for biasing the pressing rollers toward the fixed rollers, whereby narrow space is formed between the fixed and the pressing rollers through which the forward belt passes to be elliptically deformed so that the materials may be compressed.

2. A tubular belt conveyor as defined in claim 1 wherein the support frame comprising the fixed rollers and the pressing rollers is disposed around a horizontally running belt.

3. A tubular belt conveyor as defined in claims 1 or 2 wherein the belt is rolled up by overlapping the inner surface of one peripheral end on the outer surface of the other peripheral end.

4. A tubular belt conveyor as defined in claims 1 or 2 wherein the belt is rolled up by contacting inner surfaces with each other at the peripheral ends.

* * * * *